S. & A. E. PHILLIPS.
MOTOR VEHICLE.
APPLICATION FILED JAN. 5, 1911.

1,005,068.

Patented Oct. 3, 1911.
2 SHEETS—SHEET 1.

Witnesses
M. E. Seaver.
Edith L. Smith.

Inventors
Stephan Phillips &
Andrew E. Phillips, by
Bonnhardt & Co.
Attorneys

S. & A. E. PHILLIPS.
MOTOR VEHICLE.
APPLICATION FILED JAN. 5, 1911.

1,005,068.

Patented Oct. 3, 1911.
2 SHEETS—SHEET 2.

Witnesses

Inventors:
Stephan Phillips &
Andrew E. Phillips.

Attorneys

UNITED STATES PATENT OFFICE.

STEPHAN PHILLIPS AND ANDREW E. PHILLIPS, OF CLEVELAND, OHIO.

MOTOR-VEHICLE.

1,005,068.      Specification of Letters Patent.      Patented Oct. 3, 1911.

Application filed January 5, 1911. Serial No. 601,039.

*To all whom it may concern:*

Be it known that we, STEPHAN PHILLIPS and ANDREW E. PHILLIPS, citizens of the United States, residing at Cleveland, in the county of Cuyahoga and State of Ohio, have invented certain new and useful Improvements in Motor-Vehicles, of which the following is a specification.

This invention relates to motor vehicles and has for its object to provide improved means for converting an ordinary automobile into a motor sleigh, capable of use on snow and ice.

The invention embodies the application to an ordinary wheeled motor vehicle, of traction wheels adapted to drive the vehicle over snow or ice, said wheels being operatively connected to the ordinary driving or power devices of the vehicle. Provision is made for raising or lowering the traction wheels, so as to put them out of or into action, as well as for shifting the drive from the transmission gearing to either the traction wheels or the ordinary driving wheels.

When the automobile is used as a sleigh it is essential that the running wheels be locked and provided with shoes, and the invention includes novel devices for this purpose. Also, a brake is provided, operating on the driving devices of the traction wheels, in addition to the ordinary brake.

The invention is illustrated in the accompanying drawings in which—

Figure 1:
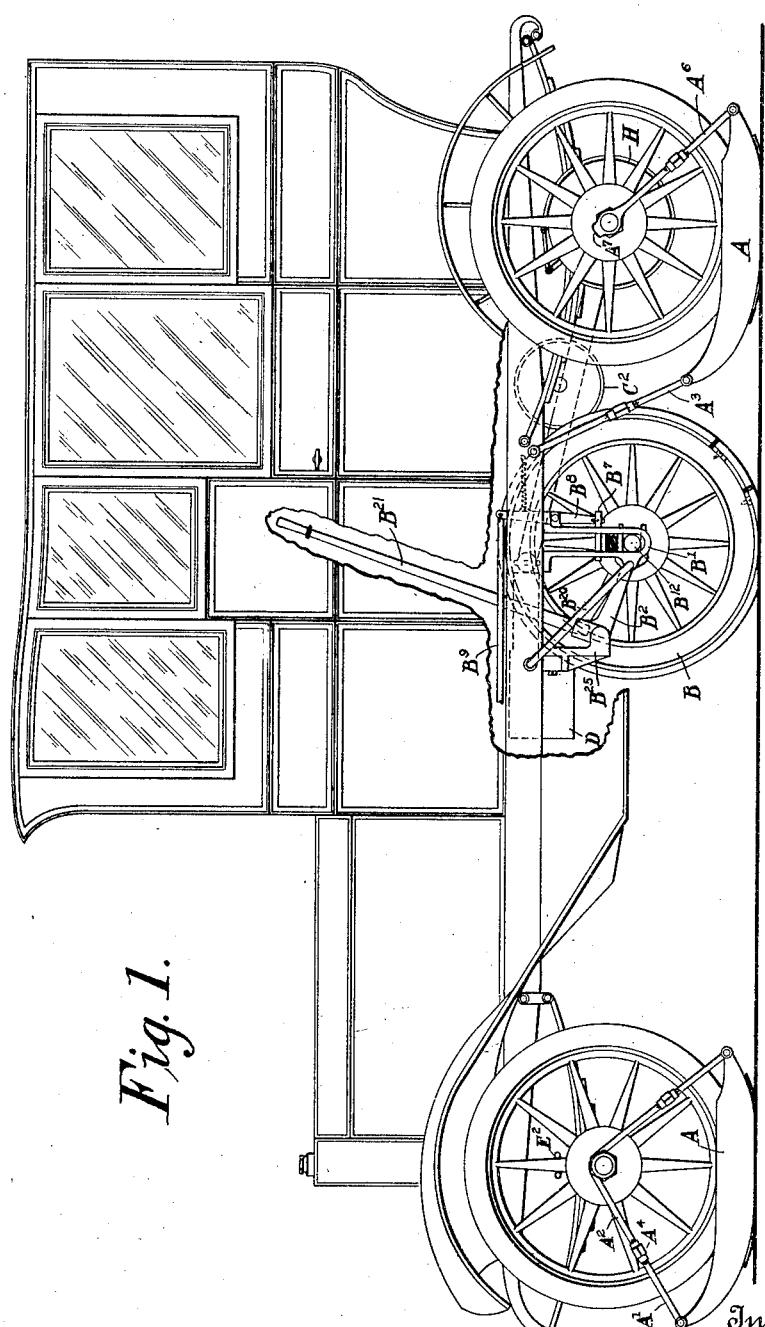
Figure 2:
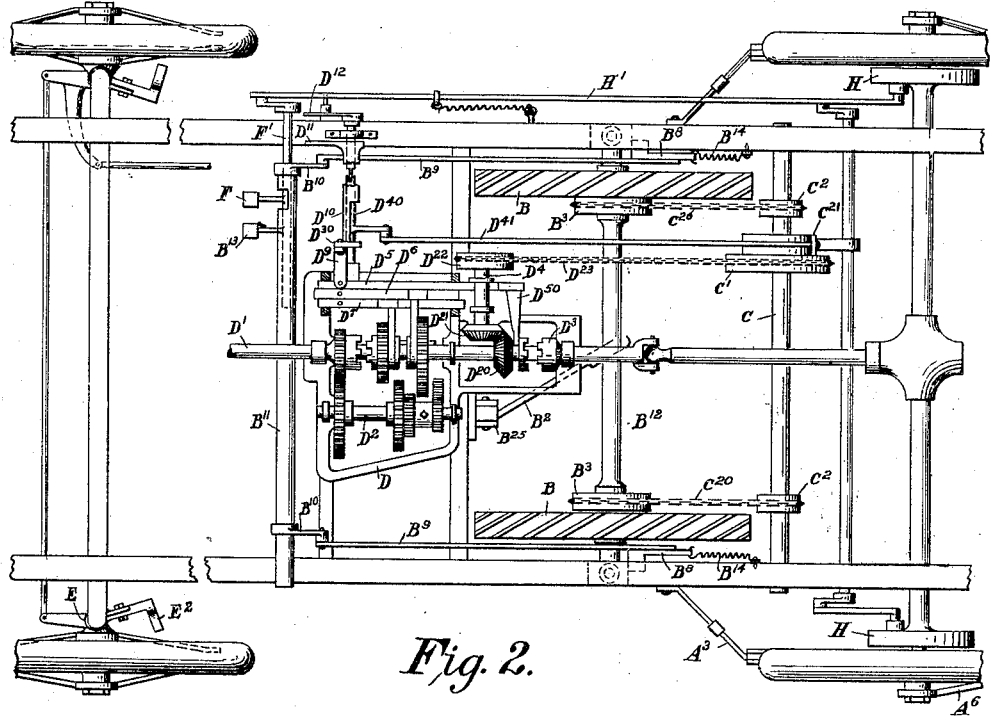
Figure 3:
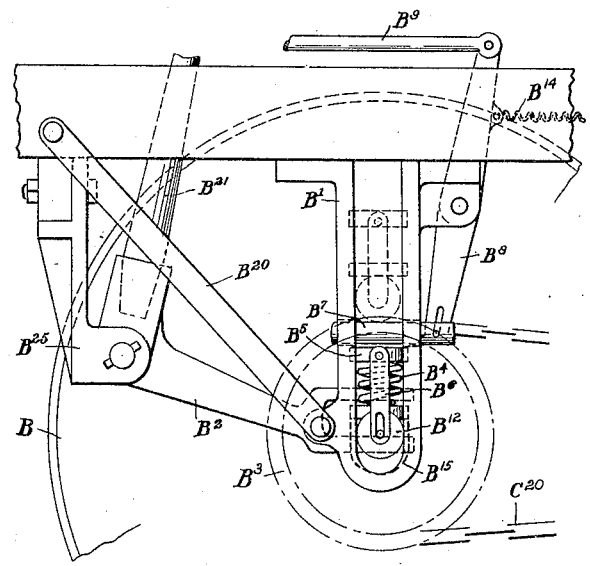

Figure 1 is a side elevation of a motor vehicle provided with the improved devices. Fig. 2 is a plan view showing the driving mechanism. Fig. 3 is an enlarged view in detail of the supports for the traction wheel shaft and the devices for raising and lowering the same.

Referring specifically to the drawings A indicates shoes for the ordinary wheels of the vehicle, and these shoes may be attached or detached according to conditions. That is when the vehicle is operating as a sleigh they will be attached, and when operating as usual they will be removed. The front shoes turn with the front wheels for steering purposes, and have an outer rib or edge $A^5$ to assist the steering action. The shoes on the front wheels are fastened thereto by connecting rods $A'$ and a curved rod $A^2$ engaging over the hub of the wheel, said rods being connected by turn buckles $A^4$ to fasten the same tightly. Each rear shoe is fastened to the rear wheel by a front rod $A^3$ extending between the front end of the shoe and the frame of the vehicle and a rear rod $A^6$ the upper end of which is hooked over the hub of the rear wheel as indicated at $A^7$, these rods being made in sections and connected by turn-buckles to tighten the same.

The traction wheels for driving the vehicle on snow or ice are indicated at B and are mounted on a cross shaft $B^{12}$ each end of which is carried in a bearing piece $B^{15}$ which is confined in a vertical slotted bracket or frame $B'$ which is fastened to and depends from the side sills of the vehicle frame, and is braced by a rod $B^{20}$. The traction wheels may be located at any desired position under the frame of the vehicle, but preferably about the middle thereof. The shaft $B^{12}$ may be raised or lowered by means of a lever $B^2$ provided with a fork which embraces the shaft at about the middle thereof. This lever is pivoted on a bracket $B^{25}$ depending from a cross bar on said frame and is provided with a detachable handle $B^{21}$ extending through the floor of the car. This handle may be removed when not in use. When the handle is thrown forwardly the shaft and the traction wheels carried thereby will be lifted, to raise the wheels from the ground. To hold the shaft in raised position, and also to hold the same in lowered position, each hanger $B'$ is provided with a pin $B^7$ working transversely across the same and connected by a lever $B^8$ and rod $B^9$ to crank arm $B^{10}$ on a tubular rock shaft $B^{11}$ provided with a pedal $B^{13}$ to operate the same, said pedal being conveniently located for operation by the driver. A spring $B^{14}$, connected to the lever $B^8$, normally advances the pin. A spring $B^4$ is confined between the bearing block $B^{15}$ and a block $B^5$, also slidable in the bracket $B'$, with connecting links $B^6$ to hold the parts in proper relation. This spring $B^4$ is for the purpose of pressing the traction wheels yieldingly against the surface with which they engage, and permits a certain amount of play and insures easy running of the traction wheels. When the wheels are lowered the pin $B^7$ slides in above the block $B^5$ and holds the parts down. When the wheels are raised said pin slides in under the bearings and holds the parts in raised position with the traction wheels out of contact with the ground.

The main or engine shaft is indicated at $D'$, and the transmission gearing may be constructed as usual and inclosed in the gear casing D, the back gear shaft being indicated at $D^2$, and the transmission gearing is operatively connected to drive the differential at the rear axle of the vehicle, these parts being well known and requiring no extended description. The transmitting devices include a clutch $D^3$ the movable member of which carries a bevel gear $D^{20}$. When the clutch is disengaged said member may be shifted to cause said gear $D^{20}$ to mesh with a bevel gear $D^{21}$ on a short shaft $D^4$ supported in bearings on an extension of the box D. Said shaft $D^4$ carries a sprocket wheel $D^{22}$ connected by chain $D^{23}$ to a sprocket wheel $C'$ on a countershaft C which extends across the frame of the vehicle a short distance in front of the rear axle. This shaft C transmits the drive to the shaft $B^{12}$, by means of sprockets $C^2$, chains $C^{20}$ and sprockets $D^8$ on the traction wheel shaft $B^{12}$. It will be seen that when the clutch $D^3$ is shifted to drive the differential the gears $D^{20}$ and $D^{21}$ are disengaged, and when the clutch is shifted to drive the traction wheels the differential drive mechanism is idle. Accordingly when the vehicle is to be driven as usual the clutch will be engaged, and when the vehicle is to be used as a sleigh the gears will be engaged and the clutch disengaged.

Any suitable means may be provided for shifting the clutch member. Preferably we employ devices consisting of a modification of the ordinary means for controlling the selective speed gearing. We provide a lever $D^{11}$ operating a rocking sleeve or tubular shaft $D^{10}$ which has a crank arm $D^{30}$ carrying a bracket $D^9$ with a spring pin $D^{16}$ engageable by axial shift of the sleeve $D^{10}$ in a socket $D^{32}$ in any one of the sliding bars $D^5$, $D^6$ or $D^7$ which control the change speed or transmission gearing in a known manner. The bar $D^5$ is extended rearwardly and provided with an arm $D^{50}$ which engages and serves to shift the clutch member $D^3$. When the lever $D^{11}$ is pressed forwardly, after it is connected to the bar $D^5$, said bar is slid forwardly, and the clutch member $D^3$ is disengaged from the ordinary driving devices and its pinion $D^{20}$ is engaged with the pinion $D^{21}$, which, by means above described, drives the traction wheels. When the lever $D^{11}$ is swung backwardly the bevel pinions are disengaged and the clutch is reëngaged for the ordinary drive of the rear axle.

A brake lever, $D^{12}$, is mounted upon a shaft $D^{40}$ which is connected by a rod $D^{41}$ to a brake $C^{21}$ on the shaft C, said lever $D^{12}$ being loosely mounted and shiftable in one direction, that is to the left, to operate said shaft and brake and shiftable in the other direction, or to the right, to operate the ordinary brakes H on the rear wheel, through the connecting rod $H'$ which is also connected to the rock shaft $F'$ carrying the brake pedal F. When the traction wheels are operating the brake $C^{21}$ will be used; otherwise the ordinary brakes will be used.

The invention is not limited to the particular devices illustrated and described, but various modifications may be made within the scope thereof.

One advantage of the devices described is that they may be applied with slight modification of existing parts, to ordinary automobiles, and the general plan of the invention permits the use of an automobile either as usual or as a sleigh on snow or ice.

What we claim as new is:—

The combination of a vehicle frame, brackets depending therefrom, a shaft confined in the brackets and slidable up and down therein, traction wheels carried by the shaft, movable pins extending across the brackets to hold the shaft in raised or lowered position, and a lever operatively connected to both of said pins, for moving the same.

In testimony whereof, we do affix our signatures in presence of two witnesses.

STEPHAN PHILLIPS.
ANDREW E. PHILLIPS.

Witnesses:
JOHN A. BOMMHARDT,
STEDMAN J. ROCKWELL.

Copies of this patent may be obtained for five cents each, by addressing the "Commissioner of Patents, Washington, D. C."